(No Model.)
C. H. REED.
MANUFACTURE OF CHAINS.
No. 300,640. Patented June 17, 1884.
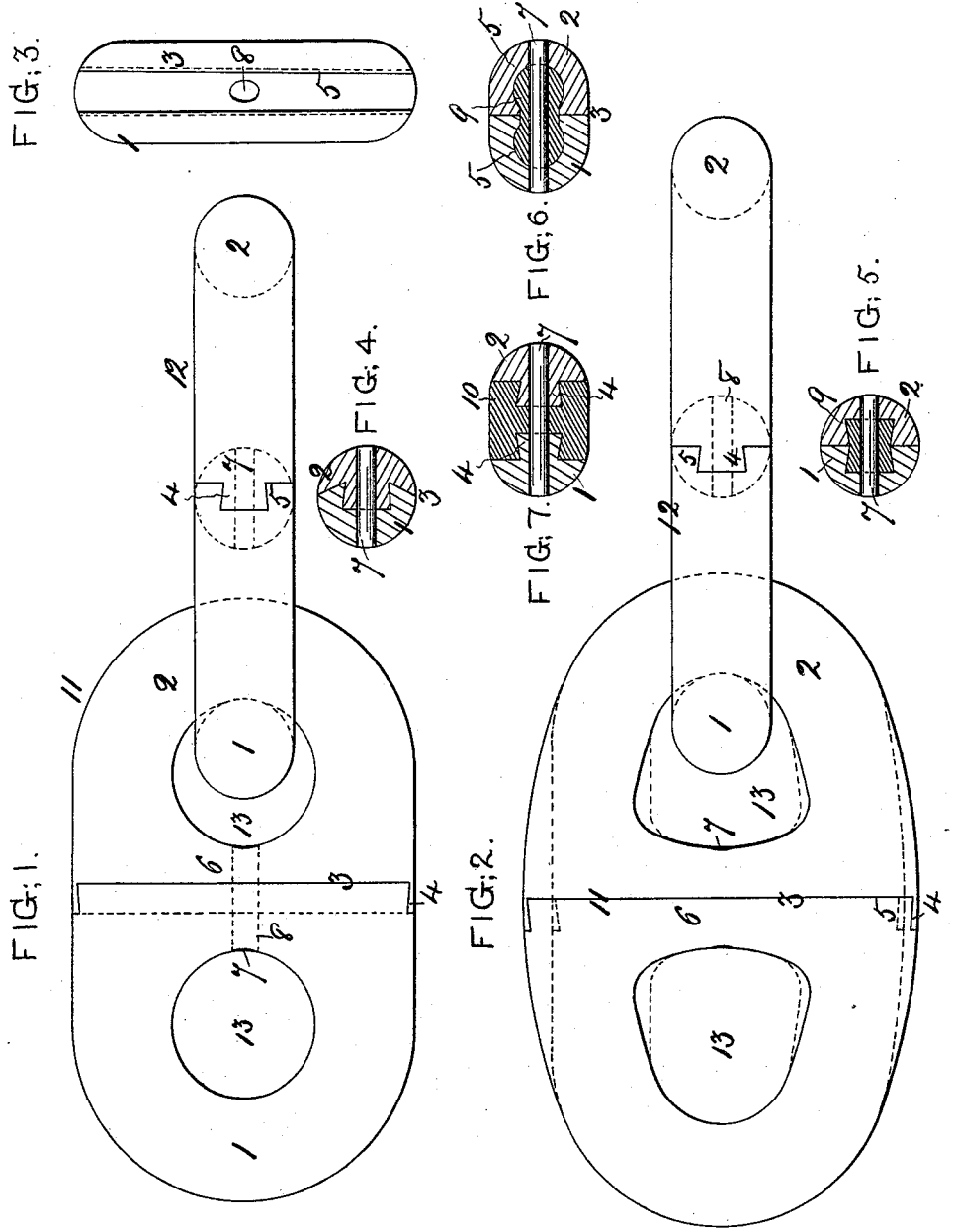
Witnesses
James F. Tobin
John W. Clayton
Inventor
Charles H. Reed
by his Attorneys
Howen & Sons

UNITED STATES PATENT OFFICE.

CHARLES HOLLOWAY REED, OF SUNDERLAND, COUNTY OF DURHAM, ENGLAND.

MANUFACTURE OF CHAINS.

SPECIFICATION forming part of Letters Patent No. 300,640, dated June 17, 1884.

Application filed October 3, 1883. (No model.) Patented in Belgium October 4, 1883, No. 62,780; in France October 5, 1883, No. 157,853; in Germany October 5, 1883, No. 26,853, and in England October 6, 1883, No. 4,752.

*To all whom it may concern:*

Be it known that I, CHARLES HOLLOWAY REED, of Sunderland, in the county of Durham, England, manufacturer, a subject of the Queen of Great Britain and Ireland, have invented certain Improvements in the Manufacture of Chains, of which the following is a specification.

The principal objects of the present improvements are to dispense with the process of welding in the manufacture of the links of chains and chain-cables, and to manufacture such links of cast-steel, cast or malleable or cast malleable iron, or other suitable metal in parts, in such a manner as that the links may be readily and completely formed by simply and securely fitting such parts together, substantially in the manner hereinafter described. One modification of this improved system of manufacture is illustrated on the accompanying drawings in Figures 1 to 4, and comprises the formation of the links in half-parts 1 2, and the uniting of such parts to form the complete links by means of dovetailing or similarly fitting the one part into the other. In carrying this modification into effect, the parts 1 2 to be joined together are cast or otherwise formed in the required metal with the parts or faces 3, which are intended to be fitted together, of corresponding but inverse formation, so that the tongue or projection 4 of the one part, 2, will fit into the dovetail or recess 5 of the other part, 1. These projecting parts 4 and corresponding recesses, 5, are respectively formed on and in cross-pieces 6, extending from side to side of the parts of the links. These cross-pieces are cast or formed together with the parts 1 2 of the links, and they are of considerable advantage in strengthening the links and as struts in preventing any lateral collapse thereof. The parts thus formed are fitted together to form the complete link by sliding or inserting the tongue of the one part into the recess of the other. The parts may then be securely fastened with a cotter or pin, 7, or other such means inserted through an elliptical or circular hole, 8, to prevent them from becoming separated.

I do not limit myself to any particular formation of the tongues 4 and recesses 5 either as regards their dimensions or precise shape, as some formations may be better fitted for certain particular uses than others, and I should in practice use those which experience would determine to be best suitable to the strains which the intended chain or cable might have to bear.

The sides of the recesses or slots and of the tongues or keys may be made with a slight taper from end to end, as shown in Fig. 3, to admit of the ready introduction endwise of the tongue or key into the recess or slot; or they may be made parallel.

Figs. 1, 2, and 4 illustrate, by way of example, different formations of the juxtaposed parts with one formation of the slot and tongue.

In another modification, illustrated in Figs. 5 and 6, dovetailed slots or other suitable recesses, 5, are formed in the opposite faces of both the parts 1 2, which will form one link, and these parts are united by a reversely-conformed key-piece, 9, having tongues 4, which fit into the slots or recesses 5 in the parts of the link, or as illustrated in Fig. 7, dovetailed recesses may be formed in an intermediate key-piece, 10, and the tongues be formed on the opposite faces of the parts of the link. In either arrangement the parts may be secured by a pin or cotter or other such means. Each part of the link is preferably cast complete with its recess or tongue; but the latter may be subsequently formed by cutting, or finished to perfect form by filing or other means. These improvements may be applied to links of various forms, proportions, and contours. Fig. 1 represents a parallel-sided link of one formation.

Fig. 2 represents in full lines the form and proportion of the links of chain-cables used in the British navy. The dotted lines in this figure show a parallel-sided link and an intermediate contour, all of the same formation as regards fitting the parts of the links together, as seen best in the plan views of the links.

In order that links formed after this improved system may be connected into continuous chains or cables, I cast or form the one part, 2, of one link, and place it in a suitably-shaped mold, and cast or form the connecting part 1 of the next adjacent link about it, so that when removed from the mold the adjacent end parts, 2 1, of the adjacent links 11 12 will be in usual connection, the solid part of each link passing through the aperture or opening 13 in the other.

The above-described system of forming links in parts which can be readily connected together, and of forming the adjacent end parts of adjacent links in connected pairs, is resultant of very considerable practical advantages. Should any faulty link of a chain or cable exhibit its defect or weakness on being tested, or should any damage or breakage occur to any link of a chain or cable at sea or elsewhere, it can be immediately replaced by a sound link. Chains and cables can be more readily made and with less skilled labor by this improved system of construction than is possible with any system wherein the links are welded, and they can be made, according to the present invention, of a less weighty construction for any required strength than according to existing systems of construction, so that in a given length of cable a considerable reduction of weight can be effected without loss of strength, and they may thus be rendered more portable, and may be transported or carried either in detached pairs of parts of adjacent links, or in short lengths of connected links, which, when required, can be most easily and securely fitted together into any desired length.

I claim as my invention—

1. A chain-cable consisting of a series of links, each made in two parts or halves united by a transverse joint, substantially as described.

2. A chain-link made in two halves, united by a transverse dovetailed or undercut joint, and a pin to prevent lateral movement of one half on the other, substantially as set forth.

3. A chain-link made in two halves, 1 2, each having openings 13, and transverse pieces 6, and united by a dovetailed or undercut joint and a retaining-pin, substantially as described.

In testimony whereof I have signed my name to this specification in the presence of two subscribing witnesses.

CHARLES HOLLOWAY REED.

Witnesses:
ARTHUR R. REED,
HENRY JACKSON.